United States Patent
Chhabra et al.

(10) Patent No.: US 9,838,367 B2
(45) Date of Patent: Dec. 5, 2017

(54) BINDING A TRUSTED INPUT SESSION TO A TRUSTED OUTPUT SESSION

(71) Applicant: Intel Corporation, Santa Clara, CA (US)

(72) Inventors: Siddhartha Chhabra, Hillsboro, OR (US); Prashant Dewan, Hillsboro, OR (US); Reshma Lal, Hillsboro, OR (US); Ulhas S. Warrier, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 186 days.

(21) Appl. No.: 14/752,379

(22) Filed: Jun. 26, 2015

(65) Prior Publication Data
US 2016/0380985 A1 Dec. 29, 2016

(51) Int. Cl.
| | | |
|---|---|---|
| *H04L 9/00* | (2006.01) | |
| *H04L 29/06* | (2006.01) | |
| *H04L 29/08* | (2006.01) | |
| *G06F 21/74* | (2013.01) | |
| *G06F 21/82* | (2013.01) | |

(52) U.S. Cl.
CPC ............ *H04L 63/061* (2013.01); *G06F 21/74* (2013.01); *G06F 21/82* (2013.01); *H04L 63/062* (2013.01); *H04L 63/0876* (2013.01); *H04L 67/146* (2013.01); *H04L 2463/062* (2013.01)

(58) Field of Classification Search
CPC . H04L 63/061; H04L 63/062; H04L 63/0876; H04L 2463/062; G06F 21/74; G06F 21/82
See application file for complete search history.

(56) References Cited

U.S. PATENT DOCUMENTS

| | | |
|---|---|---|
| 8,543,838 B1 | 9/2013 | Au et al. |
| 8,645,716 B1 | 2/2014 | Dujari et al. |
| 9,646,174 B2 * | 5/2017 | Kobres .................. G06F 21/70 |

(Continued)

FOREIGN PATENT DOCUMENTS

WO   2015-048069 A1   4/2015

OTHER PUBLICATIONS

STIC Search Report (Requested and Received Aug. 4, 2017).*
International Search Report and Written Opinion issued in PCT Application No. PCT/US2016/034699, dated Sep. 7, 2016, 13 pages.

*Primary Examiner* — Sharon Lynch
(74) *Attorney, Agent, or Firm* — Grossman, Tucker, Perreault & Pfleger, PLLC

(57) ABSTRACT

According to an embodiment provided herein, there is provided a system that binds a trusted output session to a trusted input session. The system includes a processor to execute an enclave application in an architecturally protected memory. The system includes at least one logic unit forming a trusted entity to, responsive to a request to set up a trusted I/O session, generate a unique session identifier logically associated with the trusted I/O session and set a trusted I/O session indicator to a first state. The system includes at least one logic unit forming a cryptographic module to, responsive to the request to set up the trusted I/O session, receive an encrypted encryption key and the unique session identifier from the enclave application; verify the unique session identifier; and responsive a successful verification, decrypt and save the decrypted encryption key in an encryption key register.

18 Claims, 7 Drawing Sheets

(56) References Cited

U.S. PATENT DOCUMENTS

| | | | |
|---|---|---|---|
| 2006/0095768 A1* | 5/2006 | Hoshino | H04L 29/12009 713/168 |
| 2009/0210699 A1 | 8/2009 | Grewal et al. | |
| 2011/0314468 A1* | 12/2011 | Zhou | G06F 9/45558 718/1 |
| 2014/0068248 A1* | 3/2014 | Kobres | G06F 21/82 713/155 |
| 2014/0089650 A1 | 3/2014 | Polzin et al. | |
| 2014/0281529 A1* | 9/2014 | Epp | H04L 63/0428 713/168 |
| 2015/0086012 A1 | 3/2015 | Chhabra et al. | |
| 2016/0134660 A1* | 5/2016 | Ponsini | H04L 63/20 726/1 |
| 2016/0315922 A1* | 10/2016 | Chew | H04L 63/061 |
| 2017/0177293 A1* | 6/2017 | Krishnakumar | G06F 3/165 |

* cited by examiner

BINDING A TRUSTED INPUT SESSION TO A TRUSTED OUTPUT SESSION

TECHNICAL FIELD

The present disclosure relates to data security.

BACKGROUND

Software Guard Extensions or "SGX" is a hardware enforced security system that encrypts data stored to protected regions of memory. The data stored in such memory is decrypted by resources in the processor just prior to being processed. SGX provides protection against both software and hardware attacks. More specifically, SGX provides confidentiality, integrity and replay protection to data resident in architecturally protected memory locations ("enclave data") while the data remains resident in platform memory. The on-chip boundary forms a natural security boundary, where data and code is stored in plaintext and assumed secure. While SGX defines the architecture to secure computation of an application on the CPU and its associated data while resident in the platform memory, for many use cases the application requires user interaction to receive input, process the received input, and generate output. Hence, in order to provide end-to-end security, the input and output sessions must be protected along with the computation.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
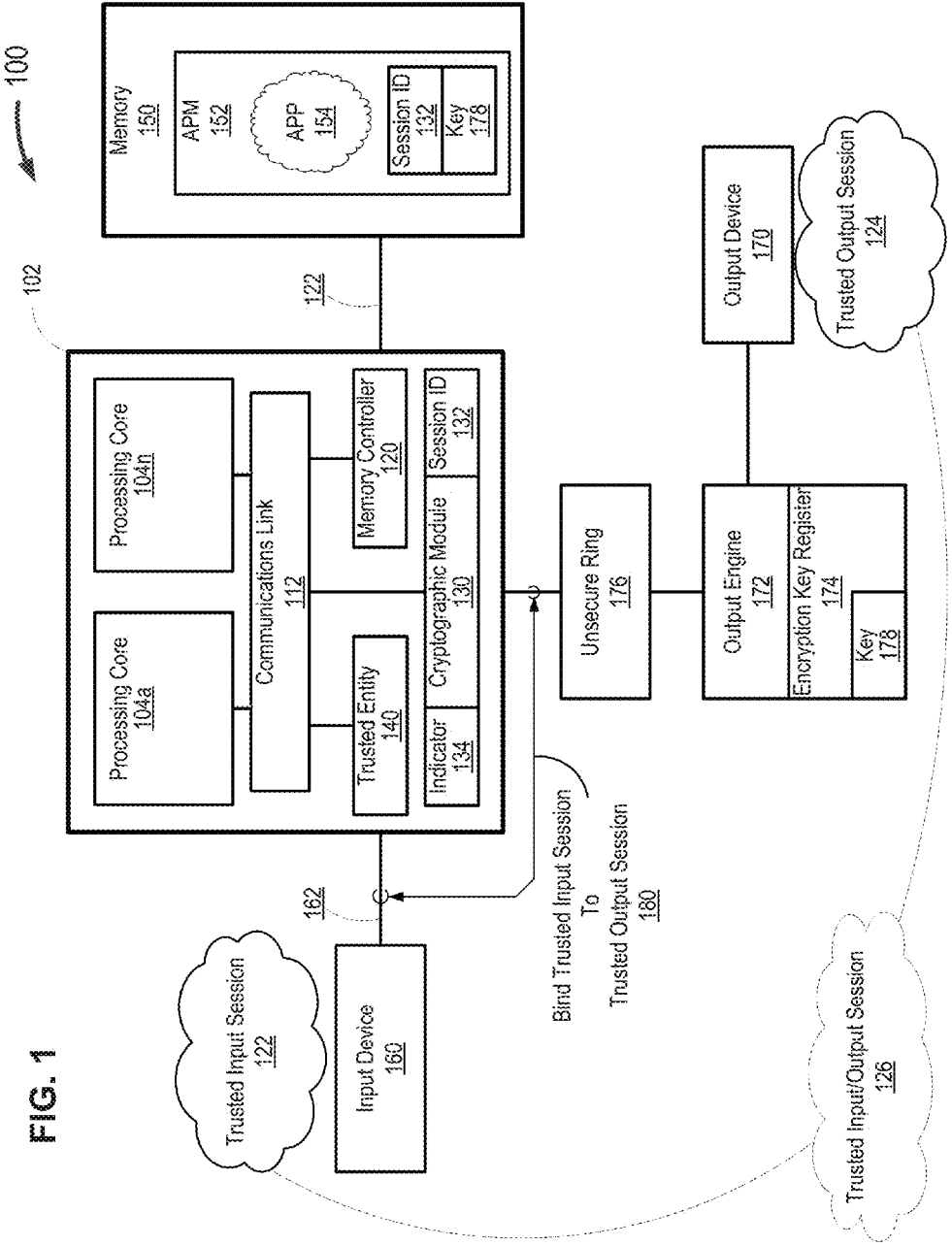
FIG. 1 illustrates an example system capable of binding a trusted input session to a trusted output session in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

A processor executing an application within an enclave or similar architecturally protected memory can setup and maintain a secure input channel to provide input to the enclave application and a secure output channel to provide a path for presentation of output data generated by the enclave application. With secure input, the processor establishes a trusted input channel between an input device and the enclave application, ensuring input to the enclave application is not visible to the higher level software such as the device operating system which may be compromised, malicious, or buggy. With secure output, the processor establishes a trusted output channel between an output device and the enclave application. The enclave application generates and encrypts output, such as bitmaps, which are shared securely with the output engine, such as a display engine. The output engine reads the encrypted output, decrypts the output, and provides the decrypted output to an output device. While the trusted input and trusted output sessions are usually independent of each other, most use cases require both the trusted input session and the trusted output session be active at the same time, i.e., be contemporaneous.

By way of illustrative example, an automated teller machine ("ATM") often requires a trusted output session to securely display a user interface screen on which the ATM user can enter their password and a trusted input session to securely receive and protect the password entered by the ATM user. Many such use cases similarly require a trusted I/O session that includes both a trusted input session and trusted output session to maintain the integrity and security of information supplied by the system or device user. In essence, the trusted output session must co-exist with the trusted input session and upon closure of the trusted input session, the trusted output session must be closed.

This disclosure is directed to binding a trusted input session to a trusted output session to limit unauthorized access to user information. Such unauthorized access may, for example, be accomplished by closing the trusted input session and maintaining the trusted output session in an open state. In such instances, the trusted output session may continue to display trusted output while any input provided in response to the displayed trusted output (e.g., user IDs, passwords, and the like) is communicated on an untrusted (e.g., Ring 0) input channel. Communicating the input on an unsecure or untrusted input channel opens the possibility of theft or misappropriation of the input data provided by the user. Such attacks, where a trusted input session associated with a trusted output session is permitted to close while the trusted output session remains open may be referred to as an "unbinding attack" since the attack is facilitated by the failure to close the trusted output session when the trusted input session is closed. The likelihood of such an unbinding attack can be minimized or even eliminated by logically binding or linking the closure of the trusted input session to the closure of the trusted output session such that upon closure of the trusted input session, the trusted output session is also closed. Binding the trusted input session to the trusted output session effectively precludes the reuse of encrypted output generated by the enclave application during prior trusted output sessions.

In one implementation, an application executing in an architecturally protected memory location (i.e., an "enclave") may send a request to initiate a trusted I/O session to a trusted entity, for example a Converged Security Engine ("CSE") such as those found on processors manufactured by Intel® Corporation (Santa Clara, Calif.). In response to the request, the trusted entity generates a unique session identifier logically associated with the respective trusted I/O session and transmits the unique session identifier to the enclave application requesting the trusted I/O session and to a cryptographic module ("CM") where the unique session identifier is stored. The trusted entity also sets a Trusted I/O Session Indicator in the CM to a first state. The enclave application generates an encryption key used to generate some or all of the output provided by the enclave application. The enclave application encrypts or "wraps" the encryption key and combines the wrapped encryption key with the unique session ID to form a "key blob" that, as encrypted, can be communicated to the CM via an unsecure Ring 0 communication channel. Upon receipt of the key blob, the CM verifies the unique session ID in the key blob against the stored unique session ID. Upon successful verification of the unique session ID and confirmation that the trusted I/O session indicator is in the first state, the CM decrypts the encryption key and writes the encryption key to an encryption key register accessible by an output engine. At this point, the trusted I/O session has been set up and the enclave application can send encrypted bitmaps via an untrusted channel (e.g., a Ring 0 channel) to the output engine. Using the encryption key stored in the encryption key register, the output engine decrypts the bitmaps for presentation to the user.

At the conclusion of the trusted I/O session, the enclave application will request a teardown of the trusted I/O session by sending a request to the trusted entity. Upon receipt of a teardown request from the enclave application, the trusted entity sets the trusted I/O session indicator in the CM to a second state. Responsive to setting the trusted I/O session indicator in the CM to a second state, the CM overwrites the encryption key register, deleting the encryption key from the output engine.

Together, the generation of the unique session identifier by the trusted entity upon initiation of the trusted I/O session and the use of the trusted I/O session indicator work synergistically to improve system security by linking or "binding" a particular trusted input session with a particular trusted output session. This binding effectively prevents unbinding attacks and replay attacks in which encrypted output surreptitiously obtained during a prior trusted output session is used to trick a user into providing input via an unsecure or untrusted input channel from which all or a portion of the input data is exposed to theft or misappropriation. The focus on closure of the trusted output session is attributable, at least in part, to the vulnerability of the output session set-up and teardown requests which are frequently handled by untrusted software that can drop the request to setup/drop the session and fake response back to the enclave application.

Setting the trusted I/O session indicator to the second state effectively precludes the surreptitious use of the encrypted output generated by the enclave during the preceding trusted I/O session. For example, if an encrypted output bitmap from a prior trusted output session has been surreptitiously obtained, because the encryption key in the encryption key register has been overwritten, the output engine will be unable to decrypt the bitmap and will consequently provide a meaningless or unintelligible output.

In another example, if a new trusted I/O session is requested to display encrypted output data obtained during a prior trusted output session, the trusted entity generates a new unique session identifier that is logically associated with the requested trusted I/O session. In such instances, the decryption and display of the encrypted output will be prevented since the newly issued unique session identifier will not match the unique session identifier included with the encrypted output.

FIG. 1 illustrates an example system 100 capable of binding 180 a trusted input session 122 to a trusted output session 124 in accordance with at least one embodiment of the present disclosure. The system 100 can include a processor 102 having any number of processing cores 104a-104n (collectively "processing cores 104"). A communications link 112 communicably couples the processing cores 104 to a number of devices or modules such as a memory controller 120, a cryptographic module 130, and a trusted entity 140. Although the memory controller 120, the cryptographic module 130 and the trusted entity 140 are depicted as being carried by or onboard the processor 102, it should be understood that some or all of the memory controller 120, the cryptographic module 130 and the trusted entity 140 may be disposed in whole or in part external to the processor 102. For clarity and comprehension, the subsequent discussion describes the implementation of a single example trusted I/O session. It is understood that any number of such contemporaneous or partially overlapping trusted I/O sessions may be provided by the system 100.

In embodiments, the trusted entity 140 can include hardware, software, or combinations thereof. In instances where the trusted entity 140 executes firmware, the firmware represents a trusted component. In embodiments, the trusted entity 140 can include, but is not limited to, devices such as a Converged Security Engine or "CSE" or similar security structure. In at least some instances, the converged security engine includes identity provide (IdP) logic embedded in the security engine and provides a trusted execution environment (TEE) within a semiconductor device such as the processor 102, a chipset, and similar devices.

In embodiments, the cryptographic module 130 can include hardware, software, or any combination thereof. The cryptographic module 130 can include any systems, devices, or combinations thereof capable of generating, storing, or distributing security credentials such as the encryption keys described herein.

At least one link 122 directly or indirectly (i.e., through one or more intervening devices, modules, and/or intermediary communication links) communicably couples the processor 102 to a memory 150. The memory 150 includes an enclave application 154 executing within an "enclave" or other architecturally protected memory location 152. Processing cores 104 may include logic configured to establish or otherwise implement a secure enclave or similar trusted execution environment by executing and exchanging data with the enclave application 154 resident in the architecturally protected memory 152 while preventing unauthorized access to either the application or data resident in the architecturally protected memory 152. At times the secure enclave may be divided into an encrypted portion that may reside in protected or unprotected memory, and an unencrypted or "plaintext" portion that resides only within the confines of the architecturally protected memory 152. Access to the enclave application 154 within the architecturally protected memory 152 may be protected from modification by software entities external to the architecturally protected memory 152. In addition, unauthorized parties are generally unable to read or modify the plaintext data within the architecturally protected memory 152 via straightforward hardware attacks. The architecturally protected memory 152 may be located within the physical address space of memory 150, but is generally only accessible using privileged or non-privileged instructions used to build and enable, enter and exit, and manage the architecturally protected memory 152, and to perform other operations within the architecturally protected memory 152.

At least one link 162 directly or indirectly communicably couples the processor 102 to an input device 160. In accordance with at least one implementation of the present disclosure, at times, the link 162 can provide all or a portion of the trusted input session 122 between an input device 160 and the enclave application 154 executing in the architecturally protected memory 152. In a trusted input session, rather than being routed via unsecure Ring 0 software 176 (e.g., operating system software), the input from input device 160 may be sent via the trusted entity 140 to the enclave application 154 executing in the architecturally protected memory 152. A trusted input session 122 between input device 160 and trusted entity 140 provides a trusted and secure link between input from input device 160 and the enclave application 154, thereby preventing untrusted software from dropping the trusted input session request and surreptitiously gaining access to input provided by the user during trusted input session 122.

Output generated during the execution of enclave application 154 in architecturally protected memory 152 may be provided to output device 170 via a trusted output channel. In accordance with at least one implementation of the present disclosure, the enclave application 154 may, at times, generate an output or an encrypted output (e.g., an encrypted bitmap, audio file, haptic feedback file, and similar) capable of causing perceptible feedback to a real-world user (e.g., an image, a sound, a vibration, and similar). At such times, the enclave application 154 generates an encryption key 178, wraps encryption key 178 with a key-wrapping key and communicates the wrapped encryption key to cryptographic module 130. After successfully verifying the trusted input/output (I/O) session 126, the cryptographic module 130 unwraps the encryption key and writes the encryption key 178 to the encryption key register 174 accessible by output engine 172. At times, application 154 uses an unsecure kernel mode driver executing in unsecure ring 176 (e.g., Ring 0) to transmit encrypted output to the output engine 172. After writing the encryption key 178 to the encryption key register 174, the output engine 172 decrypts the encrypted output provided by the enclave application 154 and presents the unencrypted output to a user via the output device 170.

In accordance with at least one implementation of the present disclosure, the processor 102 executes instructions that cause the trusted input session 122 to bind 180 with the trusted output session 124 to form the trusted I/O session 126. In trusted I/O session 126, a tear down request from the enclave application 154 causes the teardown of both the trusted input session 122 and the trusted output session 124 due to the binding 180 of the trusted input session 122 to the trusted output session 124 by the processor 102. In embodiments, the processor 102 binds 180 the trusted input session 122 to the trusted output session 124 in a manner that precludes or prevents the use of encrypted output generated during prior trusted output sessions 124. In embodiments, the processor 102 binds 180 the trusted input session 122 to the trusted output session 124 in a manner that renders encrypted output generated during prior trusted output sessions 124 unintelligible to a system user.

The processor 102 binds 180 the trusted input session 122 to the trusted output session 124 by at least causing trusted entity 140 to generate a unique session identifier 132 for each new trusted I/O session 126 requested by the enclave application 154. In some instances, the unique session identifier 132 can be generated using a monotonic counter incremented for each trusted session 126 requested by the enclave application 154. In other instances, the unique session identifier 132 can be generated using a pseudorandom number generator that creates a sufficiently large number to minimize the generation of duplicate values (e.g., a 128 bit or larger random number). The unique session identifier 132 is provided to the cryptographic module 130 and stored in the cryptographic module 130. The unique session identifier 132 is also provided to the enclave application 154 and stored in an architecturally protected memory location accessible by the enclave application 154.

In addition, the processor 102 binds 180 the trusted input session 122 to the trusted output session 124 by at least causing the trusted entity 140 to set a trusted I/O session indicator 134 in or accessible to the cryptographic module 130 to a first state. The first state is indicative of the opening or existence of the current trusted I/O session 126. When the trusted I/O session indicator 134 is in the first state, the cryptographic module 130 writes the encryption key 178 to encryption key register 174. Encryption key register 174 is in a location accessible to output engine 172. The output engine 172 decrypts the encrypted output produced by enclave application 154 when the encryption key 178 is stored in the encryption key register 174. The processor 102 sets the trusted I/O session indicator 134 to a second state when the enclave application 154 requests tear down of trusted I/O session 126. Upon placement of the trusted I/O session indicator 134 in the second state, cryptographic module 130 wipes or deletes the encryption key 178 from encryption key register 174, for example by performing a number of sideband writes to the encryption key register 174 to overwrite the encryption key 178.

Figure 2:
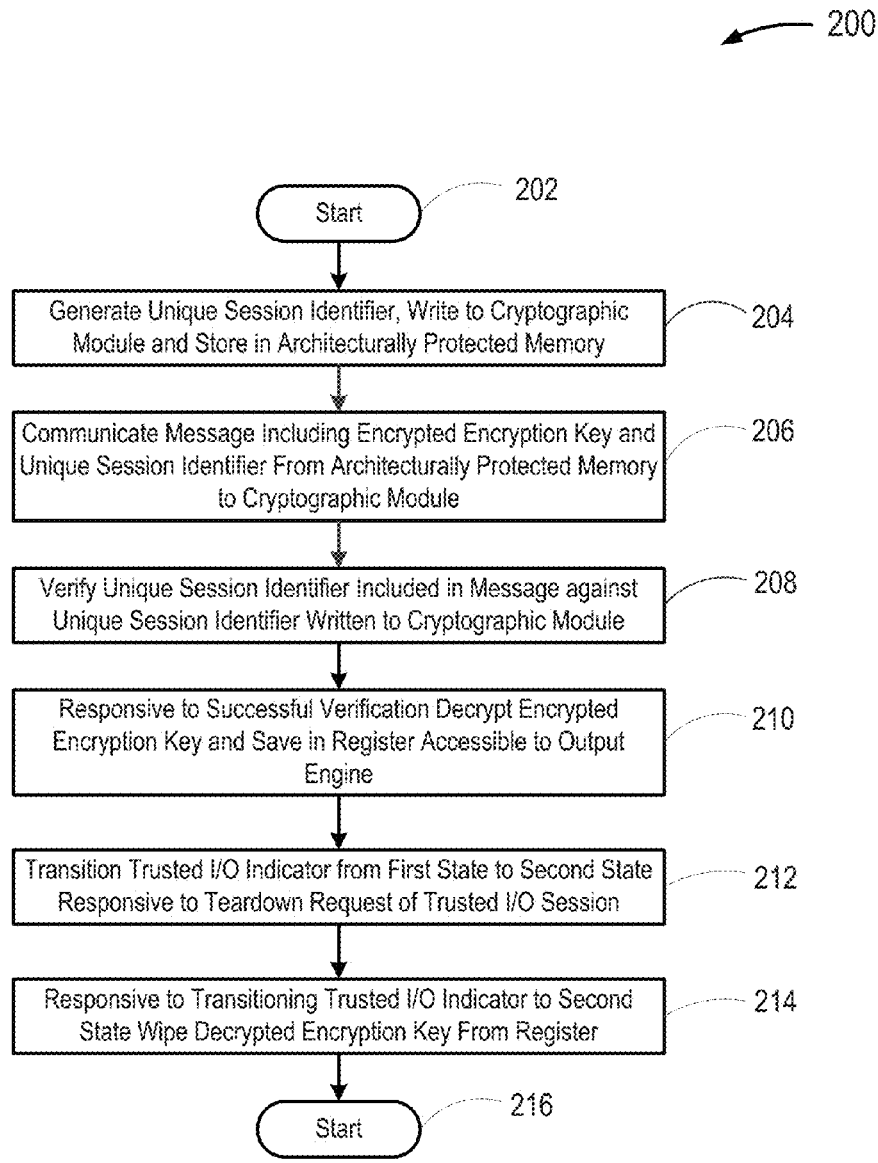
FIG. 2 illustrates an example method of binding a trusted input session to a trusted output session in accordance with at least one embodiment of the present disclosure.

FIG. 2 depicts a high-level logic flow diagram of an example method 200 of binding 180 a trusted input session 122 to a trusted output session 124 to provide a trusted I/O session 126, in accordance with one or more aspects of the present disclosure. In some embodiments, the unique session identifier 132 and the trusted I/O indicator 134 are used to bind 180 trusted input session 122 to trusted output session 124 such that, upon closure of trusted input session 122, trusted output session 124 is also closed. Binding the closure of trusted output session 124 to the closure of trusted input session 122 precludes the reuse of encrypted output generated by the enclave application 154 during a prior trusted output session 124. The method 200 commences at 202.

At 204, the processor 102 generates the unique session identifier 132. The processor 102 writes the unique session identifier 132 to the cryptographic module 130. The processor 102 also writes the unique session identifier 132 to the architecturally protected memory 152 accessible by the enclave application 154. In embodiments, the processor 102 can use an on-chip or off-chip trusted entity 140 to generate the unique session identifier 132. At times, the trusted entity 140 generates the unique session identifier 132 using a monotonic counter that is incremented for each new trusted I/O session 126. At other times, the trusted entity 140 generates the unique session identifier 132 using a pseudorandom number generator having a sufficient number of bits (e.g., 128 bits) to reduce the likelihood of duplicate unique session identifiers 132 to an acceptable level.

At 206, the processor 102 communicates a message including an encrypted encryption key and the unique session identifier 132 stored in the architecturally protected memory 152 to a cryptographic module 130. In embodiments, the enclave application 154 generates or otherwise obtains an encryption key 178 used for encrypting output generated by the enclave application 154. The enclave application 154 encrypts the encryption key 178 to securely transmit the encryption key 178 to the cryptographic module

130. At times, the enclave application 154 uses a key-wrapping key to encrypt the encryption key 178—in such implementations, the encrypted encryption key may be referred to as a "wrapped key." The enclave application 154 combines the wrapped key with the unique session identifier 132 stored in the second memory location. The combined wrapped key and unique session identifier 132 may, at times, be referred to as a "key blob." In embodiments, the enclave application communicates the wrapped key and the unique session identifier 132, i.e., the key blob, to the cryptographic module 130.

At 208, the processor 102 verifies the unique session identifier 132 included in the key blob or message at 206 against the unique session identifier 132 written to the cryptographic module 130. If the processor 102 cannot verify the session identifier 132 in the key blob against the unique session identifier 132 written to the cryptographic module 130, the cryptographic module 130 does not decrypt the wrapped key included in the key blob and method 200 terminates.

At 210, in response to a successful verification of the unique session identifier 132 included in the key blob against the unique session identifier 132 stored in the first memory location, the processor 102 decrypts the encrypted encryption key and stores the decrypted encryption key 178 in a register 174 accessible by the output engine 172. In embodiments, the cryptographic module 130 can decrypt the wrapped key in the key blob and store the decrypted encryption key 178 in an encryption key register 174 accessible by the output engine 172. The output engine 172 uses the stored encryption key 178 to decrypt output received from the enclave application 154.

At 212, the processor 102 transitions the trusted I/O session indicator 134 from the first state to the second state responsive to the receipt of a trusted I/O session teardown request. In embodiments, the enclave application 154 transmits a request to teardown the trusted I/O session 126 to the trusted entity 130. In response to receiving the request, the trusted entity 130 sets the trusted I/O session indicator 134 to the second state.

At 214, responsive to transitioning the trusted I/O session indicator 134 to the second state, the processor 102 wipes or deletes the decrypted encryption key from the register accessible by the output engine 172. In embodiments, the cryptographic module 130 detects the transition of the trusted I/O session indicator 134 to the second state. Responsive to detecting such a transition of the trusted I/O session indicator 134, the cryptographic module 130 wipes or deletes the encryption key 178 from the encryption key register 174. At times, the cryptographic module 130 can wipe, delete, erase, or otherwise remove or render useless the encryption key 178 from the encryption key register 174 by performing a number of sideband writes to the encryption key register 174, thereby deleting the encryption key 178.

The output engine 172 is unable to decrypt encrypted output subsequent to the wiping of the encryption key 178 from the register. Such encrypted output may be generated by the enclave application 154 (which is very unlikely, since the enclave application 154 has previously requested closure of the trusted I/O session 126 at 212) or (more likely) be surreptitiously introduced to the output engine 172 to spoof a prior trusted output in an attempt to extract personal data or other information from a system user. In embodiments, the cryptographic module 130 deletes, erases, or overwrites the encryption key 178 stored in the encryption key register 174 to preclude the use of the key by the output engine 172.

By deleting the encryption key 178 the output engine 172 cannot decrypt encrypted output generated by the enclave application 154 during a prior trusted output session 124. Such effectively prevents an unbinding attack where, after closure of the trusted I/O session 126, a party sends a copy of the encrypted output generated by the enclave application 154 during a prior trusted output session 124 (e.g., a PIN entry screen) to the display engine 172 and collects the user input provided in response to the spoofed trusted output (e.g., the user's PIN). The method 200 concludes at 216.

Figure 3:
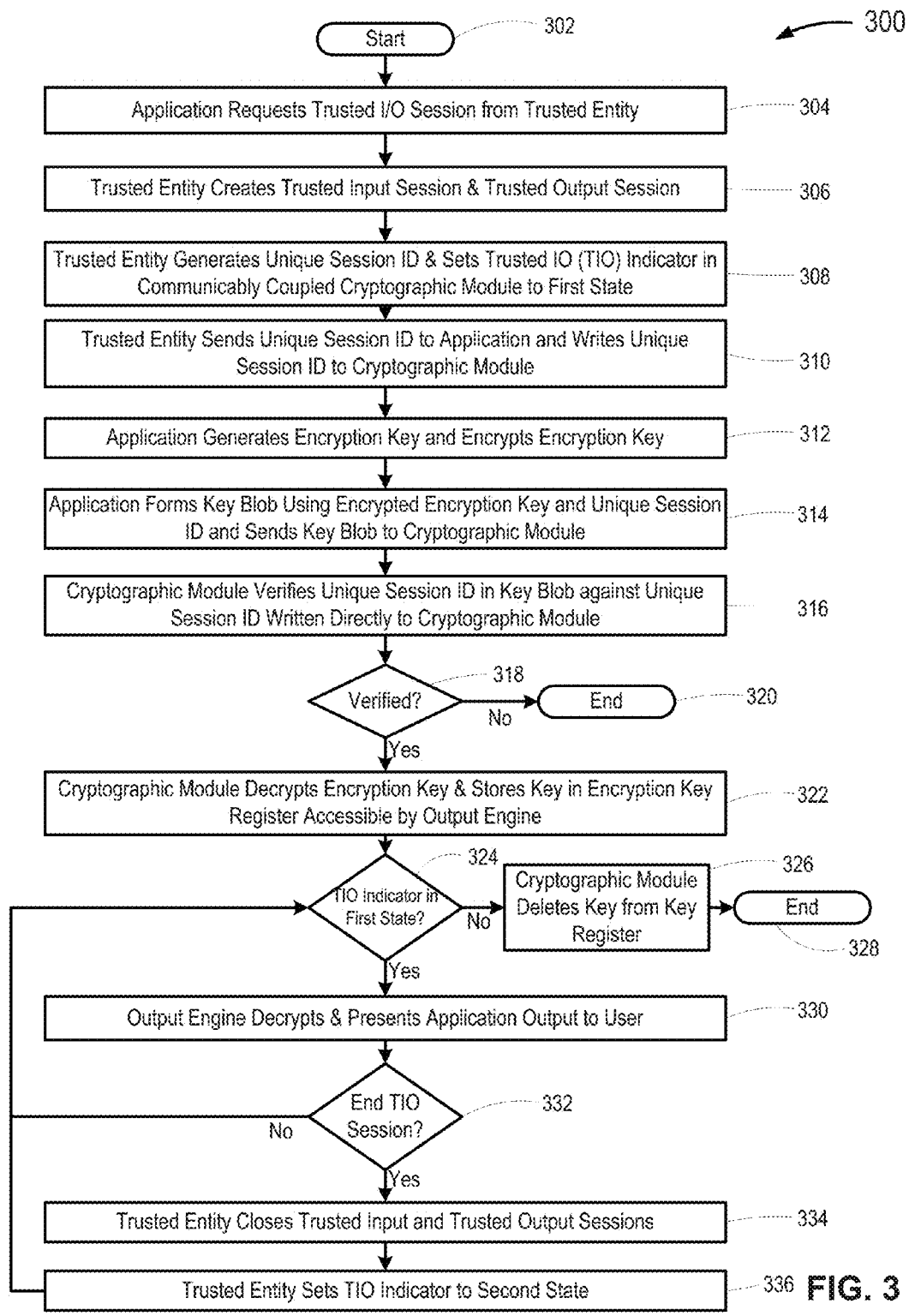
FIG. 3 illustrates another example method of binding a trusted input session to a trusted output session in accordance with at least one embodiment of the present disclosure.

FIG. 3 depicts a high-level logic flow diagram of an example method 300 of binding a trusted input session 122 to a trusted output session 124 to provide a trusted I/O session 126, in accordance with one or more aspects of the present disclosure. The trusted I/O session 126 binds or links 180 the contemporaneous existence of a specific trusted input session 122 to the existence of a specific trusted output session 124. Through the use of a unique session identifier 132 generated by the trusted entity 140 and a trusted session indicator 134 set by the trusted entity 140, encrypted output generated by the enclave application 154 during other (i.e., previous) trusted I/O sessions 126 is precluded from reuse or presentation to a user. The method 300 commences at 302.

At 304, the enclave application 154 executing in the architecturally protected memory 152 requests set-up of a trusted I/O session 126. In embodiments, the enclave application 154 communicates the trusted I/O session request to the trusted entity 140.

At 306, the trusted entity 140 establishes a trusted input session 122 providing a secure input channel 162 that communicably couples the enclave application 154 with at least one input device 160. The trusted entity 140 further establishes a trusted output session 124 providing a secure or encrypted output channel 156 that communicably couples the enclave application 154 with at least one output engine 172.

With the secure input session 122 established, instead of communicating input data across an unsecured ring (e.g., Ring 0) that can be compromised, input data is instead sent directly to the enclave application 154 executing in the architecturally protected memory 152. The trusted input channel 162 protects input data against observation by malware, prevents data modification attacks against the input data, and ensures protection against replay attacks. For example, the trusted input channel 162 securely routes touch input coordinates from an input device 160, such as a touchscreen display, to trusted entity 140 which routes the touch input coordinate locations to the enclave application 154. Trusted input session 122 involves only trusted entities and thus assures proper input session setup and termination since untrusted software cannot drop these requests.

At 308, the trusted entity 140 generates a unique session identifier 132. In some instances, the unique session identifier 132 can be a value determined using a monotonic counter that increments for each new trusted I/O session 126. In some instances, the unique session identifier 132 can be a pseudo-randomly generated value. To avoid repetition of a single unique session identifier 132 when using a pseudo-random value, the value should contain a sufficiently large number of bits (e.g., 128 bits).

In embodiments, the trusted entity 140 also causes the cryptographic module 130 to set a trusted session indicator 134 to a first state. In other embodiments, the trusted entity 140 directly sets a trusted session indicator 134 in a location accessible to the cryptographic module 130 to the first state. When set to the first state, the trusted session indicator 134 provides an indication of the enclave application's 154 request to establish the trusted I/O session 126 at 304.

At 310, the trusted entity 140 communicates the unique session identifier 132 generated at 308 to the cryptographic module 130 and to the enclave application 154. The trusted session indicator 134 and the unique session identifier 132 may be communicated by the trusted entity 140 in a single message or packet or in different messages or packets. The unique session identifier 132 written to the cryptographic module 130 may be stored in a location accessible by the cryptographic module 130 or within the hardware of the cryptographic module 130 itself. The unique session identifier 132 provided to the enclave application 154 may be stored in a location within the architecturally protected memory 152 that is accessible to the enclave application 154.

At 312, the enclave application 154 generates or otherwise acquires an encryption key 178. The enclave application 154 encrypts the encryption key 178 with a key-wrapping key to produce a "wrapped key."

At 314, the enclave application 154 combines the wrapped key with the unique session identifier 132 provided by the trusted entity 140 at 308. In addition to combining the wrapped key and the unique session identifier 132, the enclave application 154 may add a trusted session indicator bit indicative of the request for the trusted I/O session 126. The enclave application 154 may also add one or more optional display policy flags or bits to limits the presentation of the output data to one or more types of output devices. The resultant data structure, containing at least the wrapped key, the unique session identifier 132, and the trusted session indicator bit forms a data structure known as a "key blob." The enclave application 154 communicates the key blob to the cryptographic module 130 via a trusted channel or via unsecure ring 176.

At 316, cryptographic module 130 verifies the unique session identifier 132 included in the key blob against the unique session identifier 132 written to the cryptographic module 130 by the trusted entity 140 at 310.

At 318, if the verifications of the unique session identifier 132 included in the key blob sent by the enclave application 154 against the stored unique session identifier 132 is unsuccessful, cryptographic module 130 does not decrypt the encryption key provided by the enclave application 154 and method 300 terminates at 320. If the cryptographic module 130 successfully verifies the unique session identifier 132, method 300 advances to 322.

At 322, in response to a successful verification of the unique session identifier 132 included in the key blob sent by the enclave application 154 against the stored unique session identifier 132 at 318, the cryptographic module 130 decrypts the wrapped encryption key and stores the encryption key 178 in a memory location such as an encryption key register 174 accessible to the output engine 172.

At 324, the cryptographic module 130 confirms the trusted I/O indicator 134 set by the trusted entity 140 at 308 is in the first state. If the trusted I/O indicator 134 is not in the first state, at 326 the cryptographic module 130 deletes or overwrites the encryption key 178 stored in the encryption key register 174. For example, the cryptographic module 130 may overwrite the stored encryption key 178 by issuing a series of sideband write commands addressed to the encryption key register 174. After overwriting or deleting the encryption key 178 stored in the encryption key register 174, the method 300 ends at 328.

If, at 324, the cryptographic module 130 confirms the trusted I/O indicator 134 is in the first state, method 300 continues at 330.

At 330, the output engine 172 decrypts encrypted output provided by the enclave application 154 using the encryption key 178 stored in the encryption key register 174. Any subsequent encrypted output generated by the enclave application 154 can be communicated to the output engine 172 via a secure channel or via unsecured ring 176.

At 332, the trusted entity 140 determines whether an instruction to tear down trusted I/O session 126 has been received, for example a request by the enclave application 154 to tear down the current trusted I/O session 126. If no tear down instruction has been received, method 300 returns to 324 until such time as a teardown instruction has been received. In such instances, the output engine 172 continues to decrypt and output the encrypted output generated by the enclave application 154.

If a tear down instruction has been received by the trusted entity 140 at 332 the method proceeds to 334.

At 334, the trusted entity 140 tears down the trusted I/O session 126 by closing the trusted input session 122 and the trusted output session 124.

At 336, the trusted entity 140 sets the trusted session indicator 134 in the cryptographic module 130 to a second state indicative of a tear down or closure of the current trusted I/O session 126. Upon setting the trusted session indicator 134 to the second state, method 300 returns to 324. At 324, since the trusted I/O indicator 134 has been set to the second state, the cryptographic module 130 will delete or overwrite the encryption key 178 stored in the encryption key register 174 (at 326) and the method 300 concludes at 328.

Figure 4A:
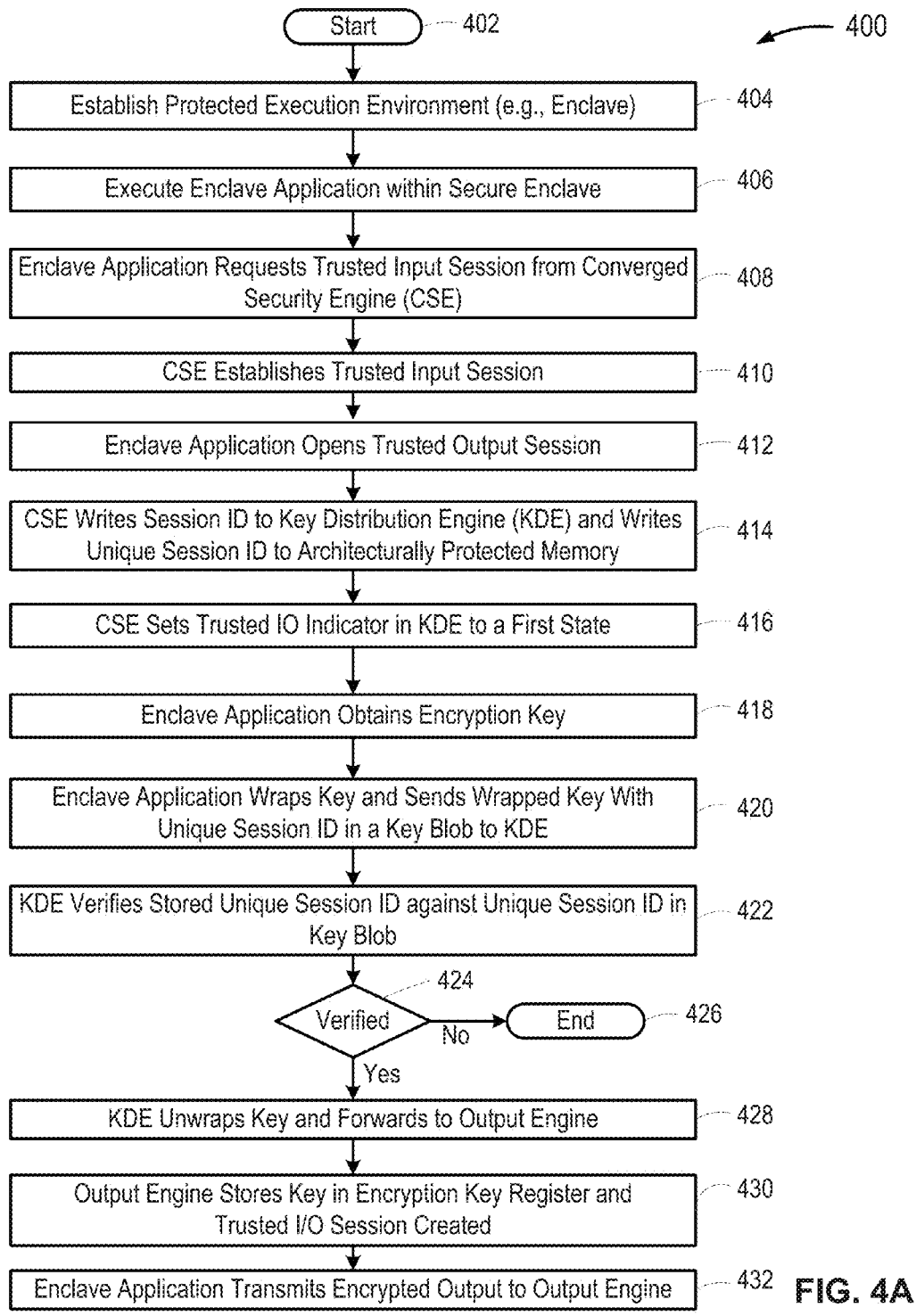
FIG. 4A illustrates an example method of setting up a bound trusted I/O session in accordance with at least one embodiment of the present disclosure.
Figure 4B:
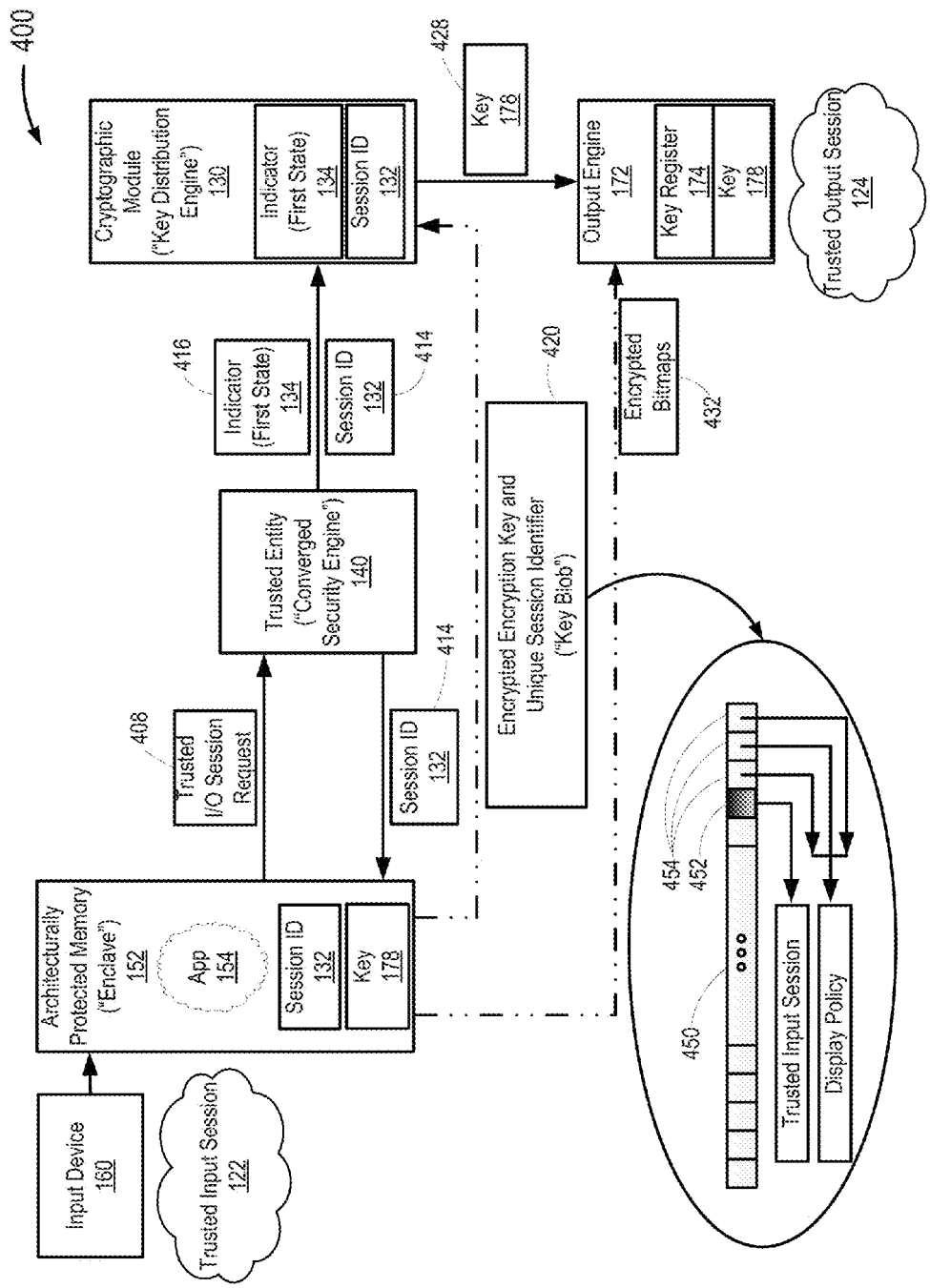
FIG. 4B illustrates an example schematic of the example method of setting up the bound trusted I/O session depicted in FIG. 4A in accordance with at least one embodiment of the present disclosure.

FIG. 4A depicts a high-level logic flow diagram of an example method 400 illustrating at least one specific implementation of as trusted I/O session 126 setup, in accordance with one or more aspects of the present disclosure. FIG. 4B depicts a schematic flow diagram of the example method 400 illustrating at least one specific implementation of as trusted I/O session 126 setup, in accordance with one or more aspects of the present disclosure. The example implementation provided in FIG. 4A includes devices, systems, modules, and components found processors produced by Intel® Corporation (Santa Clara, Calif.) but should not be interpreted to exclude similar or comparable devices, systems, and components found on processors and systems provided by other manufacturers which also fall within the scope of this disclosure. The method 400 commences at 402.

At 404, the processing cores 104 allocate portions of system memory 150 for the establishment of architecturally protected memory 152, which may be referred to as an "enclave." The enclave 152 provides a protective and protected environment in which an application 154 may be executed in plaintext because the interaction between the enclave and external devices, components, or systems occurs only via one or more trusted components or via encrypted communications with devices external to the enclave, thereby preserving the integrity of the application 154 executing in the enclave 152.

At 406, an enclave application 154 executes within the architecturally protected memory 152. For example, an enclave application 154 executed by an automated teller machine to provide cash withdrawal services to a client may execute in an architecturally protected memory 152 coupled to the ATM system processor 100.

At 408, the enclave application 154 requests set-up of a trusted I/O session 126. The communication of the trusted I/O session request from the enclave application 154 to a trusted entity 140 within the system 100 is graphically depicted in FIG. 4B. In this instance, the request to initiate the trusted I/O session 126 is received by a Converged Security Engine or "CSE" serving as a trusted entity 140 for the system 100.

Continuing with the ATM example from 406, the enclave application 154 generates the trusted I/O session request responsive to a client input, for example insertion of the client's ATM card into the ATM card reader.

At 410, at the request of the enclave application 154, the CSE/trusted entity 140 opens a trusted input session 122 and generates a unique session identifier 132 that is logically associated by the system 100 with the current trusted I/O session 126. Client data entered during the trusted input session 122 may, at times, be communicated to the CSE/trusted entity 140 via one or more secure or trusted communications channels. The CSE/trusted entity 140 forwards the received input to the enclave application 154.

At 412, the enclave application 154 opens a trusted output session 124. At times, the trusted output channel is set-up using one or more untrusted channels, for example Ring 0 software. Once the established, output data generated by the enclave application 154 may be encrypted and securely communicated via one or more secure or trusted channels or alternatively may be communicated via one or more non-secure or untrusted channels (e.g., a Ring 0 operating system channel 176) to the output engine 172.

The unique session identifier 132 may be generated using one or more devices or systems capable of providing a unique numeric or alphanumeric identifier having a very low probability of subsequent duplication. In some embodiments, the CSE/trusted entity 140 can generate a serial value for use as the unique session identifier 132, for example using a monotonic counter that increments for each new trusted I/O session request received by the CSE/trusted entity 140. In other embodiments, the CSE/trusted entity 140 can generate a pseudorandom numeric or alphanumeric value for use as the unique session identifier 132. In such instances, the pseudorandom value should include a sufficient number of bits (e.g., 128 bits) to reduce the likelihood of duplication.

At 414, the CSE/trusted entity 140 forwards the unique session identifier 132 to the enclave application 154 and to a cryptographic module 130 within the system 100. In this instance, the CSE writes the unique session identifier 132 to a hardware device such as a Key Distribution Engine or "KDE" that servers as the cryptographic module 130 for the system 100. At times, the enclave application 154 stores the unique session identifier 132 in the architecturally protected memory 152 in a location accessible by the enclave application 154. The transmission of the unique session identifier 132 to the architecturally protected memory 152 and to the KDE/cryptographic module 130 is graphically depicted in FIG. 4B.

At 416, the CSE/trusted entity 140 sets a trusted I/O session indicator 154 that is at least readable by the KDE/cryptographic module 130 to a first state (e.g., a logical "one" indicating a "true" state). In embodiments, the trusted I/O session indicator 154 remains in the first state for the duration of the current trusted I/O session 126. The setting of the trusted session indicator 134 to the first state is shown graphically in FIG. 4B.

At 418, the enclave application 154 generates or otherwise obtains an encryption key 178 for use in encrypting the output generated during the current trusted output session 124. In some embodiments, the enclave application 154 can generate the encryption key 178. In other embodiments, the enclave application 154 can obtain an encryption key 178 from one or more external system devices or components, for example a secure server communicably coupled to the system 100.

At 420, the enclave application 154 encrypts or otherwise obfuscates the encryption key 178. The enclave application 154 combines the wrapped encryption key with at least the unique session identifier 132 to form a data structure that may be referred to as a "key blob." FIG. 4B depicts the logical structure of one example key blob 450. In some embodiments, the key blob 450 may also contain one or more bits 452 indicative of the existence of the trusted I/O session 126. In some embodiments, the key blob 450 may additionally contain one or more output policy bits 454 used to limit or restrict the type or class of output devices 170 on which the encrypted output provided by the enclave application 154 may be provided to a user. The transmission of the key blob from the enclave application 154 to the KDE/cryptographic module 130 is shown graphically in FIG. 4B.

At 422, the KDE/cryptographic module 130 receives the key blob transmitted by the enclave application 154. The KDE/cryptographic module 130 verifies the unique session identifier 132 stored in the first memory location accessible by the KDE/cryptographic module 130 at 412 against the unencrypted unique session identifier 132 included in the key blob generated by the enclave application 154. In some embodiments, the KDE/cryptographic module 130 also confirms the status of the trusted I/O session indicator 134 included in the key blob generated by the enclave application 154.

At 424, if the KDE/cryptographic module 130 is unable to verify the stored unique session identifier 132 against the unique session identifier 132 included in the key blob, the method 400 concludes at 426. Alternatively, if the KDE/cryptographic module 130 is able to successfully verify the stored unique session identifier 132 against the unique session identifier 132 included in the key blob, the method 400 proceeds to 428.

At 428, responsive to a successful verification of the unique session identifier 132 carried by the key blob, the KDE/cryptographic module 130 obtains the encryption key 178 by unwrapping or decrypting the wrapped key included in the key blob received from the enclave application 154. After unwrapping the encryption key 178, the KDE/cryptographic module 130 transmits the decrypted encryption key 178 to the output engine 172. The transmission of the encryption key 178 from the KDE/cryptographic module 130 to the output engine 172 is shown graphically in FIG. 4B.

At 430, the output engine 172 stores the encryption key 178 in an encryption key register 174 accessible by the output engine 172. At this point, the output engine 172 is able to use the stored encryption key 178 to decrypt and present to a user any output generated by the enclave application 154 that is encrypted using the encryption key 178. Providing the display engine 172 the capability to decrypt output from the enclave application 154 finalizes the set up and establishes the trusted I/O session 126 requested by the enclave application at 408.

At 432, the enclave application 154 transmits output encrypted using the encryption key 178 to the display engine 172. Transmission of the encrypted output may occur using a secure or trusted connection, an unsecure or untrusted connection 176, or any combination thereof. The transmission of encrypted output generated by the enclave application 154 to the output engine 172 via an untrusted, Ring 0, connection 176 is shown graphically in FIG. 4B.

Continuing with the earlier example ATM, using the trusted output session 124, the enclave application 154 generates an encrypted output bitmap that contains a personal identification number (PIN) entry screen. The output bitmap is encrypted using the encryption key 178 and is communicated as a key blob along with the unique session identifier 132 provided to the enclave application 154 by the CSE/trusted entity 140. The encrypted PIN entry screen is communicated to the output engine 172 which decrypts the PIN entry screen using the encryption key 178 stored in the encryption key register 174. The decrypted output screen is displayed to the client via a touchscreen display on the ATM. The client enters their PIN on the touchscreen display and the coordinates of the inputs are communicated via the trusted input channel 162 to the enclave application 154.

Figure 5A:
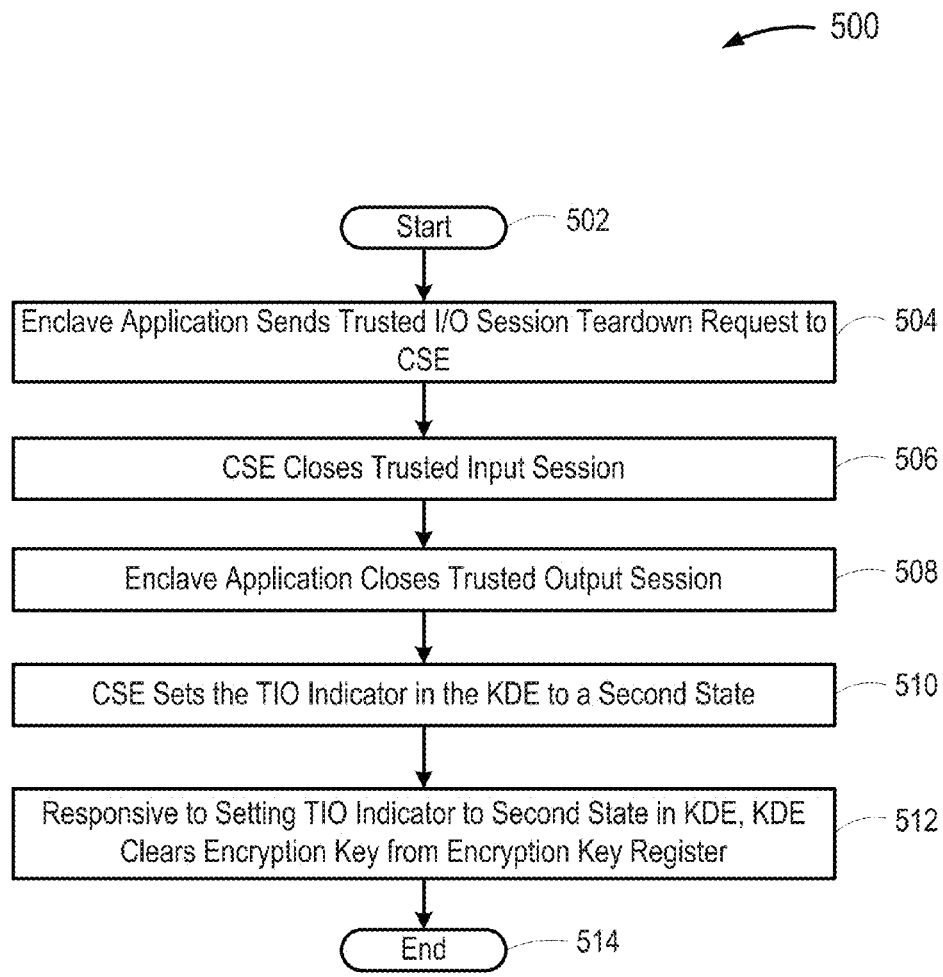
FIG. 5A illustrates an example method of tearing down a bound trusted I/O session in accordance with at least one embodiment of the present disclosure.
Figure 5B:
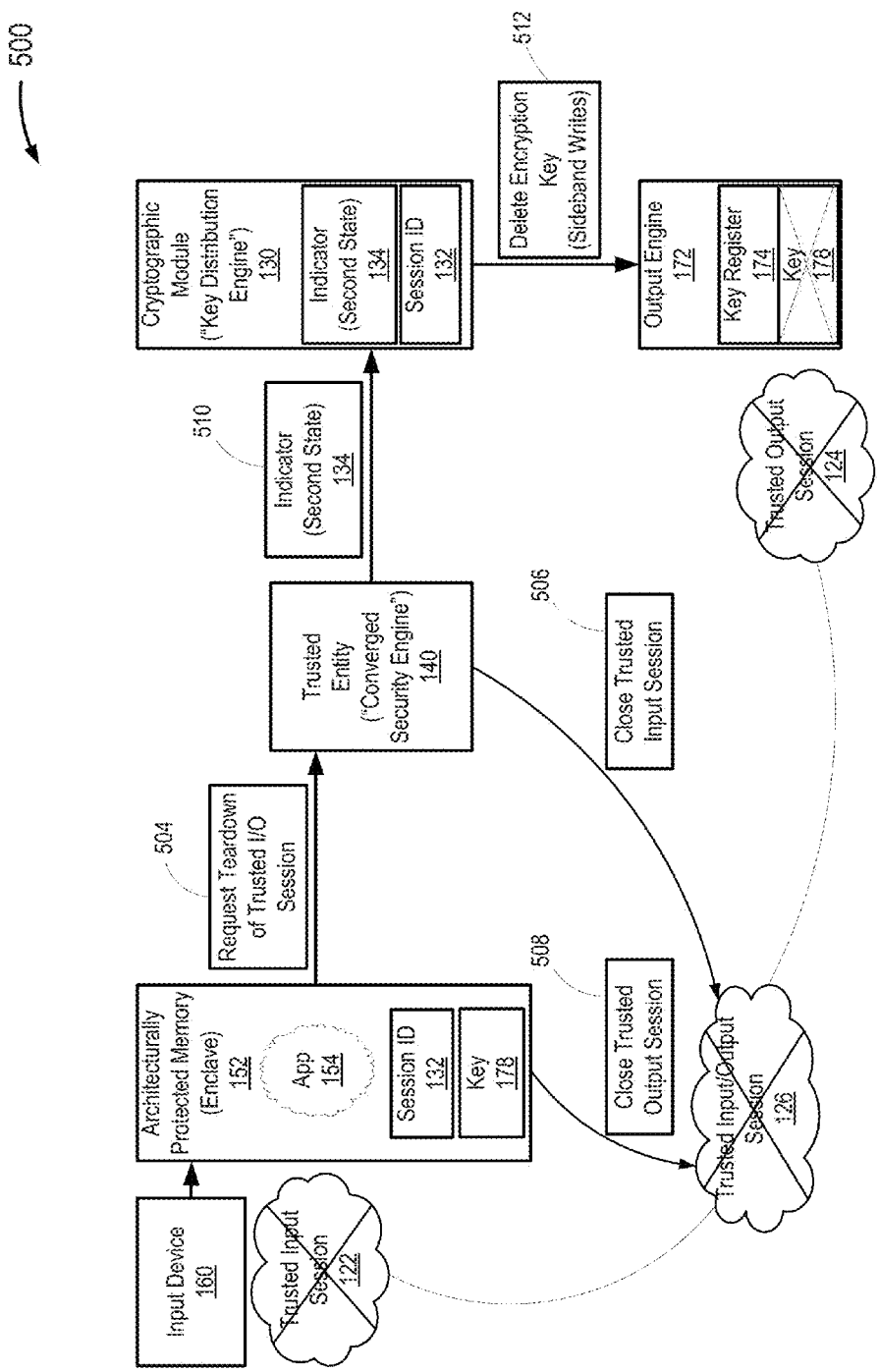
FIG. 5B illustrates an example schematic of the example method of tearing down the bound trusted I/O session depicted in FIG. 5A in accordance with at least one embodiment of the present disclosure.

FIG. 5A depicts a high-level logic flow diagram of an example method 500 illustrating at least one specific implementation of a teardown of the trusted I/O session 126 set up in method 400 and depicted in FIG. 4A, in accordance with one or more aspects of the present disclosure. FIG. 5B depicts a schematic flow diagram of the example method 500 illustrating at least one specific implementation of a teardown of the trusted I/O session 126 set up in method 400 and depicted in FIG. 4B, in accordance with one or more aspects of the present disclosure. The method 500 commences at 502.

At 504, the enclave application 154 communicates a teardown request for the current trusted I/O session 126 to the CSE/trusted entity 140. The transmission of the enclave application 154 trusted I/O session teardown request to the CSE/trusted entity 140 is shown graphically in FIG. 5B.

At 506, the CSE/trusted entity 140 closes the trusted input session 122. The closure of the trusted input session 122 by the CSE/trusted entity 140 is shown graphically in FIG. 5B. At times, the closure of the trusted input session 122 is transparent and occurs without obvious warning or notice to the system user.

At 508, the enclave application 154 closes the trusted output session 124. At times, the closure of the trusted output session 124 is accomplished in whole or in part using untrusted software.

At 510, the CSE/trusted entity 140 sets the trusted I/O session indicator 134 to a second state (e.g., a logical "zero" indicating a "false" state). In embodiments, the trusted I/O session indicator 154 remains in the second state until an enclave application requests set-up of a new trusted I/O session at which time the CSE/trusted entity 140 sets the trusted I/O session indicator 134 to the first state. In some embodiments, the trusted I/O session indicator 154 remains in the second state as a default. In other words, the trusted I/O session indicator 154 may return to the second state after a system fault, session timeout, or similar event. The setting of the trusted session indicator 134 to the second state is shown graphically in FIG. 4B.

At 512, responsive to the trusted session indicator 134 being set to the second state, the KDE/cryptographic module 130 wipes, clears, deletes, or overwrites the encryption key 178 stored in the encryption key register 174. In at least some embodiments, the KDE/cryptographic module 130 overwrites the encryption key 178 by performing a number of sideband writes to the encryption key register 174. The overwriting of the encryption key 178 in the encryption key register 178 is shown graphically in FIG. 5B. Overwriting the encryption key 178 effectively closes the trusted output session 124 by rendering any subsequent encrypted output provided to the output engine 172 unintelligible.

The CSE/trusted entity 140 setting the trusted I/O session indicator 134 to the second state and the subsequent deletion of the encryption key 178 from the encryption key register 174 by the KDE/cryptographic module 130 binds the trusted input session 122 to the trusted output session 124 and ensures that an inappropriately obtained output key blob cannot be reused to fraudulently obtain user information using unbinding attacks or a blob replay attacks as described below.

In an unbind attack, the enclave application 154 will request a trusted I/O session teardown by the CSE/trusted entity 140. The untrusted software stack can cause a denial of service on the request to the close at least the trusted output session 124. In such instances, the trusted input session 122 is permitted to close, but the untrusted software stack keeps the trusted output session 124 active. In such an instance, any user input provided to the system 100, for example input provided by the user responsive to the spoofed output being displayed by the system 100, is not transmitted via a trusted input session 122, but instead is transmitted by the untrusted software stack—thereby exposing the user supplied data to interception, capture, and potential misuse.

Continuing the ATM example from above, in an unbind attack, the trusted input session 122 closes and the trusted output session 124 remains open and displays the PIN entry screen as described at 430. The client, having once entered their PIN and continuing to see a blank PIN entry screen, re-enters their PIN a second time. Unbeknownst to the client, the second PIN entry is made after the trusted input session 122 has closed, and the entered PIN information, instead of being routed via a secure channel 162 in a trusted input session 122, is instead routed via an untrusted channel such as Ring 0 software 176. The client information routed via such an untrusted channel is subject to interception, capture, and potential misuse.

Such an unbind attack is prevented by the systems and methods described herein. Recall, after the CSE/trusted entity 140 closes the trusted input session the CSE/trusted entity 140 sets the trusted I/O session indicator 134 to the second state. In response to setting the trusted I/O session indicator 134 to the second state, the KDE/cryptographic module 130 erases the encryption key 178 from the encryption key register 174. Thus, even if the trusted output session 124 is surreptitiously maintained in an open state, without access to the encryption key 178, the output engine 172 can no longer decrypt the encrypted output provided by the enclave application. Thus, after the trusted output session 124 is closed, any encrypted output provided to the output engine 172 will be unintelligible.

Continuing with the ATM example from above, if the trusted output session 124 is held open, and the encryption key 178 has been overwritten and is unavailable, the spoofed encrypted PIN entry screen bitmap will not be decrypted and will display as a nonsensical or scrambled image on the ATM display. Such an output should alert the client that a significant system error has occurred within the ATM and that further interaction with the ATM should be avoided.

In a replay attack, a new trusted I/O session 126 is requested. The CSE/trusted entity 140 opens a new trusted input session 122 and a new trusted output session 124 as requested and generates a new unique session identifier 132. After the trusted I/O session is initiated, a previously obtained key blob containing an encrypted image and unique session identifier 132 is provided to the KDE/cryptographic module 130.

Such a replay attack is also prevented by the systems and methods described herein. Recall, the CSE/trusted entity 140 generates a session identifier 140 that is unique for each trusted I/O session 126 and is used by the KDE/cryptographic module 130 to verify the contents of the key blob as generated during the current trusted I/O session 126. If a key blob containing a non-matching unique session identifier 132 (e.g., a key blob acquired from a prior trusted I/O session 126) is provided to the KDE/cryptographic module 130, the KDE/cryptographic module 130 is unable to successfully verify the old unique session identifier 132 included in the key blob against the new unique session identifier 132 generated during the current trusted I/O session 126. In such an instance, the KDE/cryptographic module 130 does not unwrap the encryption key 178 from the key blob and does not forward the encrypted output contained in the key blob to the output engine 172.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for binding a trusted input session to a trusted output session to prevent the reuse of encrypted data obtained from prior trusted output sessions.

According to example 1 there is provided a method of providing a trusted input/output session by binding a trusted output session to a trusted input session. The method may comprise generating a unique session identifier logically associated with a trusted input/output session and writing the unique session identifier to a cryptographic module. The method includes storing the unique session identifier in an architecturally protected memory. The method also comprises communicating, by an enclave application, an encrypted encryption key and the unique session identifier in the architecturally protected memory to a cryptographic module. The method also comprises verifying, by the cryptographic module, the unique session identifier written to the cryptographic module against the unique session identifier communicated by the enclave application. The method also comprises decrypting and saving the encryption key in an encryption key register accessible by an output engine responsive to a successful verification. The method also comprises transitioning a trusted I/O session indicator from a first state to a second state responsive to the enclave application requesting a teardown of the trusted I/O session. The method additionally comprises wiping the encryption key from the encryption key register by the cryptographic module responsive to transitioning the trusted I/O session indicator to the second state.

Example 2 may include the elements of example 1 where communicating, by an enclave application, an encrypted encryption key and the unique session identifier stored in the architecturally protected memory to the cryptographic module comprises communicating, by the enclave application to the cryptographic module, an encrypted encryption key and the unique session identifier stored in the architecturally protected memory.

Example 3 may include elements example 1 where transitioning a trusted I/O session indicator from a first state to a second state responsive to the application requesting a teardown of the trusted I/O session may include setting the trusted I/O session indicator to the first state responsive to a request from the enclave application to open the trusted I/O session; and setting the trusted I/O session indicator to the second state responsive to a request from the enclave application to close the trusted I/O session.

Example 4 may include elements any of examples 1 through 3 where wiping the encryption key from the encryption key register by the cryptographic module responsive to transitioning the trusted I/O session indicator to the second state may include overwriting the encryption key by causing the cryptographic module to perform a series of sideband writes to the encryption key register.

Example 5 may include elements of example 1 where generating a unique session identifier logically associated with a trusted input/output session may include generating the unique session identifier logically associated with the trusted input/output session responsive to a request by the enclave application to open the trusted input/output session.

Example 6 may include elements of example 5 where generating the unique session identifier logically associated with the trusted input/output session responsive to a request by the enclave application to open the trusted input/output session comprises generating, by a trusted entity, the unique session identifier logically associated with the trusted input/output session.

Example 7 may include elements of example 6 where generating, by a trusted entity, the unique session identifier logically associated with the trusted input/output session may include generating, by the trusted entity, the unique session identifier by incrementing a monotonic counter for each request by the enclave application to build a trusted input/output session.

Example 8 may include elements of example 6 where generating, by a trusted entity communicably coupled to the cryptographic module, the unique session identifier logically associated with the trusted input/output session comprises generating, by the trusted entity, the unique session identifier by generating at least a 128 bit random number for each request by the enclave application to build a trusted input/output session.

Example 9 may include elements of example 6 and may further include building, by the trusted entity, a trusted input session communicably coupling the enclave application to at least one input device.

Example 10 may include elements of any of examples 6 through 9 where transitioning a trusted I/O session indicator from a first state to a second state responsive to the application requesting a teardown of the trusted I/O session may include causing, by the trusted entity, the transition of the trusted I/O session indicator from the first state to the second state.

Example 11 may include elements of any of examples 1 to 3 where communicating, by the enclave application, an encrypted encryption key and the unique session identifier stored in the architecturally protected memory to a cryptographic module may include generating, by the enclave application, an encryption key; wrapping the generated encryption key with a key-wrapping key to provide a wrapped key; and combining the wrapped key with the unique session identifier to provide a key blob.

Example 12 may include elements of example 11 and the method may further include setting, by the enclave application, a trusted input/output session indicator in the key blob to indicate a request for a trusted input/output session.

Example 13 may include elements of any of examples 1 to 3 and the method may further include generating, by the enclave application, output encrypted using the encryption key; communicating the encrypted output to the output engine; decrypting the encrypted output by the output engine using the encryption key in the encryption key register; and outputting, in a human perceptible format, the decrypted output.

According to example 14 there is provided a system that binds a trusted output session is bound to a trusted input session to provide a trusted input/output session. The system comprises a processor to execute an enclave application in an architecturally protected memory and at least one logic unit forming a trusted entity. Responsive to receipt of a request from the enclave application to open a trusted I/O session, the trusted entity: generates a unique session identifier logically associated with the trusted I/O session; stores the unique session identifier at an address in the architecturally protected memory accessible to the enclave application; and sets a trusted I/O session indicator to a first state. The system further includes at least one logic unit forming a cryptographic module. Responsive to receipt of a request from the enclave application to open a trusted I/O session, the cryptographic module: receives the unique session identifier from the trusted entity; receives an encrypted encryption key and the unique session identifier written to the architecturally protected memory from the enclave application; verifies the unique session identifier received from the trusted entity against the unique session identifier received from the enclave application; and responsive a successful verification, decrypts and saves the decrypted encryption key in an encryption key register accessible by an output engine.

Example 15 may include elements of example 14 where responsive to the enclave application requesting a teardown of the trusted I/O session, the trusted entity causes a trusted I/O session indicator to transition from the first state to a second state and where, responsive to the trusted I/O session indicator to transitioning from a first state to a second state, the cryptographic module deletes the encryption key from the encryption key register.

Example 16 may include elements of example 15 and may further comprise at least logic circuit forming an output engine that decrypts the encrypted output provided by the enclave application using the encryption key in the encryption key register. The processor may further cause the enclave application to use the encryption key to provide the encrypted output; and communicate the encrypted output to the output engine.

Example 17 may include elements of example 14 wherein the processor further causes the enclave application to generate an encryption key, wrap the encryption key with a key-wrapping key to provide the encrypted encryption key; and combine the encrypted encryption key with the unique session identifier stored in the architecturally protected memory Example 18 may include elements of example 17 wherein the machine executable instructions further cause the enclave application to set a trusted input/output session indicator in the key blob to a first state to indicate a request for the trusted input/output session.

Example 19 may include elements of any of examples 14 through 18 where the trusted entity further provides the unique session identifier by incrementing a monotonic counter for each request by the enclave application to open a new trusted I/O session.

Example 20 may include elements of any of examples 14 through 18 where the trusted entity further provides the unique session identifier by generating at least a 128 bit random number for each request by the application to open a new trusted input/output session.

According to example 21 there is provided a machine-readable storage medium having stored thereon, individually or in combination, machine readable instructions for binding a trusted input session to a trusted output session that, when executed by at least one processor, cause the at least one processor to: execute an enclave application in an architecturally protected memory. The instructions also cause the at least one processor to generate a unique session identifier logically associated with a trusted input/output session, write the unique session identifier to a hardware address accessible to a cryptographic module, and store the generated unique session identifier in the architecturally protected memory at a location accessible to the enclave application. The instructions also cause the at least one processor to cause the enclave application to communicate an encrypted encryption key and the unique session identifier in the architecturally protected memory to the cryptographic module. The instructions also cause the at least one processor to verify the unique session identifier written to the cryptographic module against the unique session identifier communicated by the application and responsive a successful verification, decrypt and save the encryption key in an encryption key register accessible by an output engine. The instructions also cause the at least one processor to cause a trusted I/O session indicator to transition from a first state to a second state responsive to a request by the enclave application to close the trusted I/O session and to delete the encryption key from the encryption key register responsive to transitioning the trusted I/O session indicator to the second state.

Example 22 may include elements of example 21 where the machine readable instructions further cause the at least one processor to cause the enclave application to generate output encrypted using the encryption key; cause the enclave application to communicate the encrypted output to the output engine; cause the output engine to decrypt the encrypted output using the encryption key in the encryption key register; and cause the output engine to output, in a human perceptible format, the decrypted output.

Example 23 may include elements of claim 22 where the machine readable instructions further cause the at least one processor to cause a trusted entity to communicably couple the enclave application to at least one input device to open the trusted input session.

Example 24 may include elements of claim 23 where the machine readable instructions that cause the at least one processor to cause a trusted I/O session indicator to transition from a first state to a second state responsive to the enclave application requesting a teardown of the trusted I/O session further cause the at least one processor to cause the trusted entity to transition the trusted I/O session indicator from the first state to the second state.

According to example 25 there is provided a system that provides a secure input/output (I/O) session. The system includes at least one logic unit forming a trusted entity that, responsive to a request by an enclave application executing in an architecturally protected memory to open a trusted I/O session: generates a session identifier unique to the respective trusted I/O session; stores the unique session identifier in a location in the architecturally protected memory accessible by the enclave application; and sets a trusted I/O session indicator to a first state. The system further includes at least one logic unit forming a cryptographic module that, responsive to a request by the enclave application to open the trusted I/O session: receives the unique session identifier from the trusted entity; stores the unique session identifier at a hardware address in the cryptographic module; receives from the enclave application an encrypted encryption key and the unique session identifier stored in the second location; and writes a decrypted encryption key to a register accessible by an output engine responsive to verification of the unique session identifier received from the enclave application against the unique session identifier stored in the first location. The system further include at least one processor communicably coupled to the trusted entity and the cryptographic module.

Example 26 may include elements of example 25 where responsive to a request from the enclave application to close the trusted I/O session, the at least one trusted entity further terminates the trusted input session; and sets the trusted I/O session indicator to a second state. Wherein, responsive to setting the trusted I/O session indicator to the second state, the cryptographic module further deletes the encryption key from the encryption key register Example 27 may include elements of any of examples 25 or 26 where the cryptographic module further receives from the enclave application a key blob that includes the encrypted encryption key and the unique session identifier stored in the architecturally protected memory, wherein the encrypted encryption key includes a wrapped key generated by wrapping the encryption key with a key-wrapping key.

Example 28 may include elements of example 27 where responsive to setting the trusted I/O session indicator to the second state, the cryptographic module further performs at least one sideband write to the encryption key register to delete the encryption key.

Example 29 may include elements of any of examples 25 through 28 and may further include at least one output device communicably coupled to the output engine.

According to example 30 there is provided a method of binding a trusted input session with a trusted output session, the method comprising, responsive to a request by an enclave application executed by a processor in an architecturally protected memory to open a trusted input/output (I/O) session: opening, by the processor, a trusted input session; opening, by the enclave application, a trusted output session; setting, by the processor, a trusted I/O session indicator to a first state; and generating, by the enclave application, a key blob that includes encrypted output and data representative of a unique session identifier logically associated with the trusted I/O session. The method further includes, responsive to successful verification of the unique session identifier included in the key blob and verifying the trusted I/O session indicator is in the first state: writing, by the processor, an encryption key to an encryption key register accessible by an output engine communicably coupled to the processor and decrypting, by the output engine, the encrypted output generated by the enclave application. The method further includes, responsive to a request by the enclave application to terminate the trusted I/O session, closing, by the processor, the trusted input session; setting, by the processor, the trusted I/O session indicator to a second state; and deleting, by the processor, the encryption key from the encryption key register responsive to setting the trusted I/O session indicator to the second state.

Example 31 may include elements of example 30 where generating, by the enclave application, a key blob that includes encrypted output and data representative of a unique session identifier logically associated with the trusted I/O session may include generating, by the processor, the unique session identifier logically associated with the trusted I/O session responsive to the receipt of the request from the enclave application to initiate the respective trusted I/O session; writing, by the processor, the unique session identifier to a specified hardware address; and writing, by the processor, the unique session identifier to a location in the architecturally protected memory accessible by the enclave application.

Example 32 may include elements of example 31 where generating, by the processor, the unique session identifier logically associated with the trusted I/O session responsive to the receipt of the request from the enclave application to initiate the respective trusted I/O session may include one of: incrementing, by the processor, a monotonic counter for each new trusted I/O session to provide the unique session indicator; or generating, by the processor, a 128 bit pseudo-random number for each new trusted I/O session to provide the unique session indicator.

Example 33 may include elements example 30 where generating, by the enclave application, a key blob that includes encrypted output and data representative of a unique session identifier logically associated with the trusted I/O session may include: communicating, via an untrusted connection, the key blob from the enclave application to a cryptographic module communicably coupled to the processor.

Example 34 may include elements of any of examples 30 through 33 where opening, by the processor, a trusted input session may include: communicably coupling a user input device to a trusted entity communicably coupled to the processor; and communicably coupling the trusted entity to the enclave application to forward received input data to the enclave application via a trusted connection.

Example 35 may include elements of any of examples 30 through 33 and may further include communicating, by the enclave application, data representative of at least one display policy to the processor via the key blob.

Example 36 may include elements of any of examples 30 through 33 where deleting, by the processor, the encryption key from the encryption key register responsive to setting the trusted I/O session indicator to the second state may include transmitting, by the processor, at least one sideband write to the encryption key register responsive to setting the trusted I/O session indicator to the second state.

According to example 37 there is provided a machine-readable storage medium having stored thereon, individually or in combination, machine readable instructions for binding a trusted input session to a trusted output session that, when executed by a processor, cause the processor to, responsive to a request to initiate a trusted input/output (I/O) session by an enclave application executed by a processor in an architecturally protected memory: open a trusted input session; cause an enclave application executing in an architecturally protected memory to open a trusted output session; set a trusted I/O session indicator to a first state; and cause the enclave application to generate a key blob that includes encrypted output and data representative of a unique session identifier logically associated with the trusted I/O session. The instructions further cause the processor to, responsive to successful verification of the unique session identifier included in the key blob and verifying the trusted I/O session indicator is in the first state: write an encryption key to an encryption key register accessible by an output engine communicably coupled to the processor; and cause an output engine to decrypt the encrypted output generated by the enclave application. The instruction further cause the processor to, responsive to a request by the enclave application to terminate the trusted I/O session; close the trusted input session; set the trusted I/O session indicator to a second state; and delete the encryption key from the encryption key register responsive to setting the trusted I/O session indicator to the second state.

Example 38 may include elements of example 37 where the machine readable instructions that cause the processor to cause the enclave application to generate a key blob that includes encrypted output and data representative of a unique session identifier logically associated with the trusted I/O session, further cause the processor to: generate the unique session identifier logically associated with the trusted I/O session responsive to the receipt of the request from the enclave application to initiate the respective trusted I/O session; write the unique session identifier to a specified hardware address in a cryptographic module communicably coupled to the processor; and write the unique session identifier to a location in the architecturally protected memory accessible by the enclave application.

Example 39 includes elements of any of examples 37 or 38 where the machine readable instructions that cause the processor to generate the unique session identifier logically associated with the trusted I/O session further cause the processor to: increment a monotonic counter for each new trusted I/O session to provide the unique session indicator; or generate a 128 bit pseudo-random number for each new trusted I/O session to provide the unique session indicator.

Example 40 includes elements of any of examples 37 or 38 where the machine readable instructions that cause the processor to cause the enclave application to generate a key blob that includes encrypted output and data representative of a unique session identifier logically associated with the trusted I/O session further cause the to: cause the enclave application to communicate the key blob to the cryptographic module via an untrusted connection.

Example 41 includes elements of any of examples 37 or 38 where the machine readable instructions that cause the processor to open a trusted input session further cause the processor to: communicably couple a user input device to a trusted entity communicably coupled to the processor; and communicably couple the trusted entity to the enclave application to forward received input data to the enclave application via a trusted connection.

Example 42 includes elements of any of examples 37 or 38 where the machine readable instructions further cause the processor to cause the application to communicate data representative of at least one display policy to the output engine.

Example 43 includes elements of any of examples 37 or 38 where the machine readable instructions that cause the processor to delete the encryption key from the encryption key register responsive to setting the trusted I/O session indicator to the second state further cause the processor to transmit at least one sideband write to the encryption key register responsive to setting the trusted I/O session indicator to the second state.

According to example 44 there is provided a system that provides trusted input/output session in which a trusted output session is bound to a trusted input session, the system comprising: a means for generating a unique session identifier logically associated with a trusted input/output (I/O) session, responsive to a receipt of a request by an enclave application executed in an architecturally protected memory to open the trusted I/O session; a means for writing the generated unique session identifier to a hardware address in a cryptographic module; a means for storing the generated unique session identifier in an architecturally protected memory; a means for communicating an encrypted encryption key and the unique session identifier in the second memory location to the cryptographic module; a means for verifying the unique session identifier stored in the first memory location against the unique session identifier communicated by the application; a means for decrypting and saving the encryption key in a register accessible by an output engine responsive a successful verification; a means for transitioning a trusted I/O session indicator from a first state to a second state responsive to receipt of a request from the enclave application to close the trusted I/O session; and a means for deleting the encryption key from the register responsive to transitioning the trusted I/O session indicator to the second state.

Example 45 includes elements of example 44 and may further include a means for generating output encrypted using the encryption key, a means for communicating the encrypted output to the output engine, a means for decrypting the encrypted output by the output engine using the encryption key in the register accessible to the output engine; and a means for outputting, in a human perceptible format, the decrypted output.

According to example 46 there is provided a system for binding a trusted input session to a trusted output session, the system being arranged to perform the method of any of examples 1 through 13.

According to example 47 there is provided a chipset arranged to perform the method of any of examples 1 through 13.

According to example 48 there is provided at least one machine readable medium comprising a plurality of instructions that, in response to be being executed on a computing device, cause the computing device to carry out the method according to any of examples 1 through 13.

According to example 49 there is provided a device configured for binding a trusted input session to a trusted output session, the device being arranged to perform the method of any of examples 1 through 13.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A system that binds a trusted output session to a trusted input session to provide a trusted input/output (I/O) session, comprising:
   a processor to execute an enclave application in an architecturally protected memory;
   at least one logic unit forming a trusted entity to, responsive to receipt of a request from the enclave application to open a trusted I/O session:
      generate a unique session identifier logically associated with the trusted I/O session;
      store the unique session identifier at an address in the architecturally protected memory accessible to the enclave application; and
      set a trusted I/O session indicator to a first state;
   at least one logic unit forming a cryptographic module to, responsive to receipt of the request from the enclave application to open the trusted I/O session:
      receive the unique session identifier from the trusted entity;
      receive an encryption key that is encrypted and the unique session identifier written to the architecturally protected memory from the enclave application;

verify the unique session identifier received from the trusted entity against the unique session identifier received from the enclave application; and responsive to a successful verification, decrypt the encrypted encryption key and save the decrypted encryption key in an encryption key register accessible by an output engine; and wherein, responsive to receipt of a request from the enclave application to close the trusted I/O session, the trusted entity to:

cause the trusted I/O session indicator to transition from the first state to a second state; and wherein, responsive to the trusted I/O session indicator transitioning from a first state to a second state, the cryptographic module to:

delete the decrypted encryption key from the encryption key register.

2. The system of claim 1, further comprising at least logic circuit forming an output engine to:

decrypt encrypted output provided by the enclave application using the decrypted encryption key in the encryption key register;

wherein the processor further causes the enclave application to:

use the encryption key to provide the encrypted output; and communicate the encrypted output to the output engine.

3. The system of claim 1 wherein the processor further causes the enclave application to:

generate the encryption key;

wrap the encryption key with a key-wrapping key to provide the encrypted encryption key; and combine the encrypted encryption key with the unique session identifier.

4. The system of claim 3 wherein the processor further causes the enclave application to:

set a trusted session indicator in the combined encrypted encryption key and unique session identifier to indicate a request for the trusted I/O session.

5. The system of claim 1, the trusted entity to further:

provide the unique session identifier by incrementing a monotonic counter for each request by the enclave application to open a new trusted I/O session.

6. The system of claim 1, the trusted entity to further:

provide the unique session identifier by generating at least a 128 bit random number for each request by the enclave application to open a new trusted I/O session.

7. A method of providing a trusted input/output (I/O) session binding a trusted output session to a trusted input session, the method comprising:

responsive to receiving a request to open a trusted I/O session from an enclave application in an architecturally protected memory location:

generating, by a trusted entity, a unique session identifier logically associated with the trusted I/O session;

writing the unique session identifier from the trusted entity to a cryptographic module;

storing the unique session identifier in the architecturally protected memory location;

setting, by the trusted entity, a trusted I/O session indicator to a first state;

communicating, by the enclave application, an encryption key that is encrypted and the unique session identifier stored in the architecturally protected memory location to the cryptographic module;

verifying, by the cryptographic module, the unique session identifier written to the cryptographic module against the unique session identifier communicated by the enclave application; and responsive to a successful verification, decrypting the encrypted encryption key and saving the decrypted encryption key in an encryption key register accessible by an output engine;

transitioning, by the trusted entity, the trusted I/O session indicator from the first state to a second state responsive to receipt of a request from the enclave application to close the trusted I/O session; and deleting the decrypted encryption key from the encryption key register by the cryptographic module responsive to transitioning the trusted I/O session indicator to the second state.

8. The method of claim 7 wherein deleting the decrypted encryption key from the encryption key register by the cryptographic module responsive to transitioning the trusted I/O session indicator to the second state comprises:

overwriting the decrypted encryption key by causing the cryptographic module to perform a series of sideband writes to the encryption key register.

9. The method of claim 7 wherein generating, by the trusted entity, the unique session identifier logically associated with the trusted I/O session comprises:

providing the unique session identifier by incrementing a monotonic counter for each request by the enclave application to open a new trusted I/O session.

10. The method of claim 7 wherein generating, by the trusted entity, the unique session identifier logically associated with the trusted input/output session comprises:

providing the unique session identifier by generating at least a 128 bit random number for each request by the enclave application to open a new trusted I/O session.

11. The method of claim 7, further comprising:

opening, by the trusted entity, a trusted input session communicably coupling the enclave application to at least one input device.

12. The method of claim 7 wherein communicating, by the enclave application, the encrypted encryption key and the unique session identifier stored in the architecturally protected memory to the cryptographic module comprises:

generating, by the enclave application, an encryption key;

wrapping, by the enclave application, the encryption key with a key wrapping key to provide a wrapped key; and combining the wrapped key with the unique session identifier stored in the architecturally protected memory to provide a key blob.

13. The method of claim 12, further comprising:

setting, by the enclave application, a trusted session indicator in the key blob to indicate a request for the trusted I/O session.

14. The method of claim 7, further comprising:

generating, by the enclave application, output encrypted using the encryption key;

communicating, by the enclave application, the encrypted output to the output engine;

decrypting the encrypted output by the output engine using the decrypted encryption key in the encryption key register; and outputting, in a human perceptible format, the decrypted output.

15. At least one non-transitory machine-readable storage medium having stored thereon, individually or in combination, machine readable instructions for binding a trusted input session to a trusted output session that, when executed by at least one processor, cause the at least one processor to:
  responsive to receiving a request to open a trusted input/output (I/O) session from an enclave application in an architecturally protected memory:
    generate, by a trusted entity, a unique session identifier logically associated with a trusted I/O session;
    write the unique session identifier from the trusted entity to a hardware address in a cryptographic module;
    store the unique session identifier to the architecturally protected memory;
    set, by the trusted entity, a trusted I/O session indicator to a first state;
    cause the enclave application to communicate an encryption key that is encrypted and the unique session identifier stored in the architecturally protected memory to the cryptographic module;
    verify the unique session identifier written to the cryptographic module against the unique session identifier communicated by the enclave application; and
    responsive to a successful verification, decrypt the encrypted encryption key and save the decrypted encryption key in an encryption key register accessible by an output engine;
  cause, via the trusted entity, a trusted I/O session indicator to transition from the first state to a second state responsive to the enclave application requesting a teardown of the trusted I/O session; and
  delete the decrypted encryption key from the encryption key register responsive to transitioning the trusted I/O session indicator to the second state.

16. The storage medium of claim 15 wherein the machine readable instructions further cause the at least one processor to:
  cause the enclave application to generate output encrypted using the encryption key;
  cause the enclave application to communicate the encrypted output to the output engine;
  cause the output engine to decrypt the encrypted output using the decrypted encryption key in the register accessible to the output engine; and
  cause the output engine to output, in a human perceptible format, the decrypted output.

17. The storage medium of claim 16 wherein the machine readable instructions further cause the at least one processor to:
  cause the trusted entity to communicably couple the enclave application to at least one input device to open the trusted input session.

18. The storage medium of claim 15 wherein the machine readable instructions that cause the at least one processor to generate the unique session identifier logically associated with the trusted I/O session, further cause the at least one processor to:
  generate the unique session identifier using either a monotonic counter that is incremented for each new trusted I/O session or at least a 128 bit pseudorandom number generated for each new trusted I/O session.

* * * * *